(12) United States Patent
Lewis et al.

(10) Patent No.: US 7,720,340 B2
(45) Date of Patent: May 18, 2010

(54) DEVICE FOR COUPLING RADIATION INTO OR OUT OF AN OPTICAL FIBRE

(75) Inventors: Steffan Lewis, Reading (GB); Glyn Edwards, Daventry (GB)

(73) Assignee: GSI Group Ltd., Warwickshire (GB)

( * ) Notice: Subject to any disclaimer, the term of this patent is extended or adjusted under 35 U.S.C. 154(b) by 0 days.

(21) Appl. No.: 12/341,149

(22) Filed: Dec. 22, 2008

(65) Prior Publication Data

US 2009/0148098 A1      Jun. 11, 2009

Related U.S. Application Data

(63) Continuation of application No. PCT/GB2007/050353, filed on Jun. 22, 2007.

(30) Foreign Application Priority Data

Jun. 23, 2006    (GB) .................................. 0612463.0

(51) Int. Cl.
  *G02B 6/036*   (2006.01)
  *C03B 37/023*   (2006.01)
  *B32B 37/00*   (2006.01)
(52) U.S. Cl. .................. 385/127; 385/126; 385/96; 385/97; 385/98; 385/99; 385/31; 385/43; 385/27; 385/28; 65/385; 65/406; 65/408; 156/166
(58) Field of Classification Search .............. 385/27, 385/28, 42, 43, 45, 46, 47, 48, 95, 96, 97, 385/98, 99, 123, 124, 125, 126, 127, 128, 385/141, 147, 31; 65/385, 406, 407, 408; 372/6; 156/166
See application file for complete search history.

(56) References Cited

U.S. PATENT DOCUMENTS

| | | | |
|---|---|---|---|
| 4,179,185 A | 12/1979 | Hawk | 385/43 X |
| 4,392,712 A | 7/1983 | Ozeki | 385/43 X |
| 4,682,849 A | 7/1987 | Kowata et al. | 385/42 X |

(Continued)

FOREIGN PATENT DOCUMENTS

EP           0353870 A1      2/1990

(Continued)

OTHER PUBLICATIONS

Berger, J et al. "Fibre-bundle Coupled, Diode End-pumped Nd:YAG Laser," Optic Letters, vol. 13 No. 4; Apr. 1988.

*Primary Examiner*—Brian M Healy
(74) *Attorney, Agent, or Firm*—Gauthier & Connors LLP

(57) ABSTRACT

A device for coupling multimode pump light and a laser signal into or out of a cladding-pumped fibre laser is disclosed, comprising an output optical fibre, a substantially un-tapered feed-through optical fibre, an annular waveguide having a tapered section, and a plurality of multimode pump fibres such that: the signal feed-through fibre is located within the annular waveguide; the signal feed-through fibre is fused into the annular waveguide in the tapered section so that the annular waveguide becomes an additional cladding layer of the feed-through fibre; the end of the feed-through fibre that is fused into the annular waveguide is optically coupled to the output optical fibre; the multimode pump fibres are optically coupled to the annular waveguide in the un-tapered section. Methods of forming the device are also disclosed.

28 Claims, 4 Drawing Sheets

U.S. PATENT DOCUMENTS

Figure 1A:
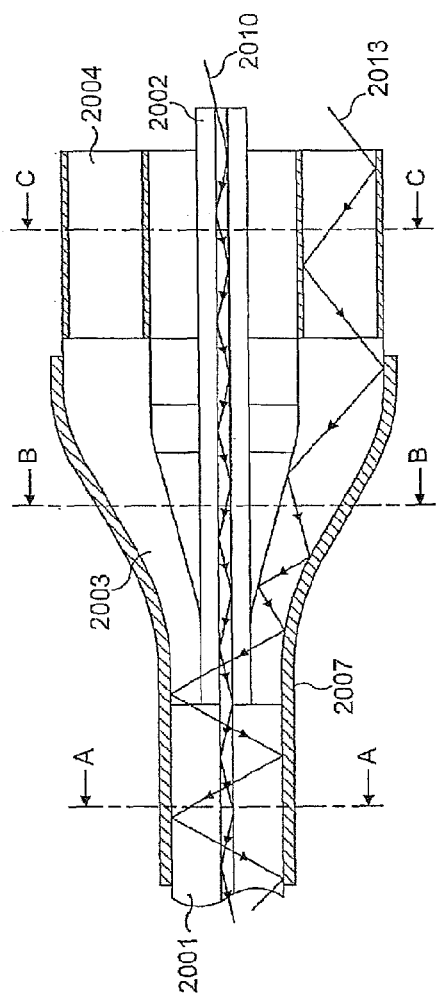
Figure 1A:
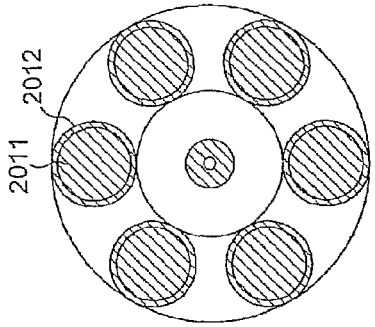
Figure 1A:
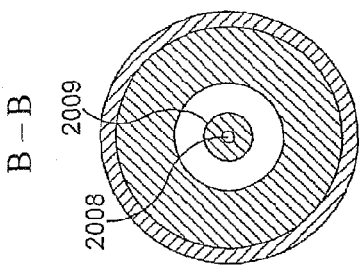
Figure 1A:
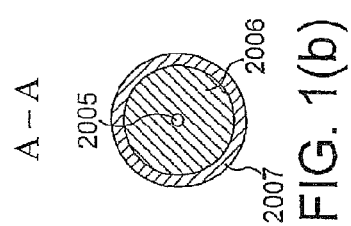
Figure 2A:
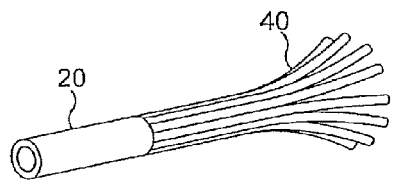
Figure 2B:
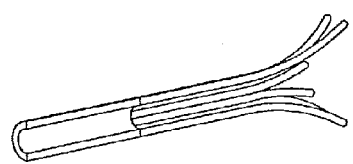
Figure 2C:
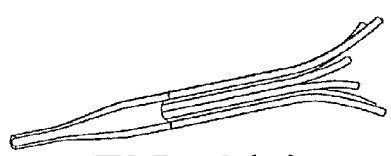
Figure 2D:
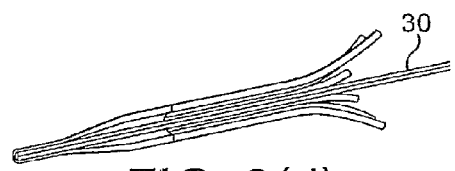
Figure 2E:
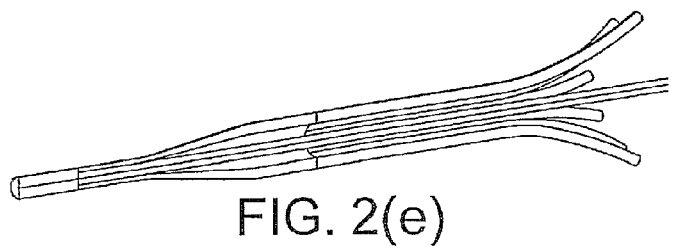

| | | | |
|---|---|---|---|
| 4,815,079 A | 3/1989 | Snitzer et al. | 372/6 |
| 4,818,062 A | 4/1989 | Scifres et al. | 372/6 X |
| 4,829,529 A | 5/1989 | Kafka | 372/6 |
| 5,048,026 A | 9/1991 | Shaw et al. | 372/6 |
| 5,129,021 A | 7/1992 | Mortimore et al. | 385/46 |
| 5,864,644 A | 1/1999 | DiGiovanni et al. | 385/43 |
| 5,935,288 A * | 8/1999 | DiGiovanni et al. | 65/408 |
| 5,999,673 A * | 12/1999 | Valentin et al. | 385/43 |
| 6,167,075 A | 12/2000 | Craig et al. | 372/6 |
| 6,411,762 B1 * | 6/2002 | Anthon et al. | 385/123 |
| 6,434,302 B1 | 8/2002 | Fidric et al. | 385/43 |
| 7,016,573 B2 | 3/2006 | Dong et al. | 385/46 |
| 2003/0031444 A1 * | 2/2003 | Croteau et al. | 385/127 |
| 2004/0095968 A1 * | 5/2004 | Avizonis et al. | 372/6 |
| 2005/0105854 A1 | 5/2005 | Dong et al. | 385/46 |
| 2009/0148098 A1 * | 6/2009 | Lewis et al. | 385/31 |
| 2009/0175301 A1 * | 7/2009 | Li et al. | 372/6 |

FOREIGN PATENT DOCUMENTS

| | | |
|---|---|---|
| WO | WO99/45419 A1 | 9/1999 |
| WO | WO2004/112206 A | 12/2004 |
| WO | WO2005029146 A1 | 3/2005 |

* cited by examiner

DEVICE FOR COUPLING RADIATION INTO OR OUT OF AN OPTICAL FIBRE

This invention relates to a device for coupling radiation into or out of an optical fibre. In particular, but not exclusively, it relates to a device for coupling multimode pump light and a laser signal into or out of a cladding-pumped fibre laser. The light and signals may be multiplexed into and de-multiplexed from the fibre.

BACKGROUND OF THE INVENTION

Cladding pumped fibre lasers are becoming well-known. A core of an optical fibre is treated to become an active gain medium, diffraction gratings are formed to act as the mirrors of a laser chamber and pump radiation is applied via a cladding layer. Pumping light is normally provided by pumping diodes and it is necessary to couple the pump light from these to the fibre.

DESCRIPTION OF PRIOR ART

The construction of fused and tapered multimode optical fibre bundles is known from U.S. Pat. No. 4,179,185 (Hawk) and U.S. Pat. No. 4,392,712 (Ozeki). The object of these constructions is to optically couple together a number of multimode optical fibres for the purpose of light distribution or combination. In one embodiment Ozeki arranged the pump multimode fibres in a bundle and subsequently fused them together using heat and tapered them to form the coupler.

U.S. Pat. No. 4,682,849 (Kowata) identified that a difficulty in constructing a fused multimode fibre bundle is fixing the bundle of pump fibres in place and keeping them in position during heating and tapering. Kowata's solution was to pack the multimode fibres inside or around glass capillaries which act as an aid to fixturing during the heating process.

Optics Letters, Vol. 13, April 1988, pp. 306-308 (Berger) and U.S. Pat. No. 4,818,062 (Scifres) disclose the use of multimode fibre bundles and fused fibre bundles to combine the output of a number of diode lasers and the use of this bundled output to pump Nd:YAG solid state lasers.

U.S. Pat. No. 4,829,529 (Kafka) disclosed a means of constructing a double-clad fibre laser in which the output of a laser diode was coupled into the first cladding of a double-clad optical fibre using a lens.

U.S. Pat. No. 4,815,079 (Snitzer) disclosed a number of methods for coupling pump light into the cladding of a multi-clad optical fibre through the side of the cladding-pumped fibre and their use in a fibre laser or amplifier.

In 1994, U.S. Pat. No. 5,999,673 (Gapontsev) disclosed a fused side coupler in which a pre-tapered multimode pump fibre is wrapped around a double clad fibre and fused to it. This is used as a means of coupling pump light into a double clad fibre though the side of the fibre.

In 1997, U.S. Pat. No. 5,864,644 (DiGiovanni) disclosed a fused and tapered fibre bundle with a single-mode feed-through fibre in the centre of the bundle and the use of this device to couple multimode pump light into the cladding of a multi-clad fibre and a laser signal into or out of the core of the multi-clad fibre.

In 1999, U.S. Pat. No. 6,434,302 (Fidric) disclosed an improved fused fibre bundle in which the multimode pump fibres are tapered in a separate step prior to bundling around the central single-mode feed-through fibre and fusion to it. This fused bundle is spliced to an output optical fibre. An advantage of Fidric's design is that the signal feed-through fibre experiences little tapering.

In 2003, U.S. Pat. No. 7,016,573 (Dong) disclosed a pump combiner in which the multimode pump fibres and a central signal feed-through fibre are arranged in a bundle and spliced onto a fibre having a larger cladding diameter encompassing the bundle. This larger fibre is subsequently tapered and spliced to an output double-clad fibre.

This prior art teaches the construction of pump and signal multiplexers and de-multiplexers that couple multimode pump light into the cladding of a multi-clad optical fibre and couple a laser signal into or out of the core of the multi-clad optical fibre (Gapontsev, DiGiovanni, Fidric, and Dong). It has also been shown that it is desirable to use a substantially fused glass construction for such a multiplexer. This is because a glass construction is able to transmit high optical powers with low loss and without damage. The fused glass construction is inherently more stable and reliable than other coupling means such as the bulk optic coupling of Kafka which relies on the alignment of bulk optical elements such as lenses. This invention relates to substantially fused glass pump and signal multiplexers/de-multiplexers for coupling laser signals and multimode pump light into and out of cladding-pumped optical fibres and the use of such components in the construction of cladding-pumped fibre lasers and amplifiers.

An inherent difficulty in the prior art multiplexers is excess loss for the laser signal in the feed-through. This problem is exacerbated by the new generation of large mode area fibres that have been developed in the last 5 years or so and which are characterized by large core diameters and low numerical apertures for the signal waveguide. The present invention is motivated by the need for pump and signal multiplexers with lower signal feed-through loss than the prior art, and the need for such multiplexers incorporating large mode area fibres. Two of the known causes of signal feed-through loss in a fused fibre pump and signal multiplexer are:

1) Tapering of the signal fibre
2) Fusion of the pump and signal fibres

Tapering of the signal fibre, in itself, can cause light to couple out of the core and into the cladding in the tapered section. Furthermore, tapering of the signal feed-through fibre in a fibre bundle and subsequent splicing of the fused and tapered bundle to an output double-clad output fibre can introduce excess losses associated with the core diameter mismatch between the tapered signal feed-through fibre and the core of the un-tapered output cladding-pumped fibre. This core diameter mismatch may be accentuated by the tapering of the feed-through fibre.

Fusion induced losses can occur when there is a lack of symmetry in the fibre bundle, or the fibres in the bundle are subject to uneven tension prior to fusion. In these cases, there is a tendency for the fibre bundle to deform when it is heated resulting in a bend or a kink. This deformation can cause the signal to escape from the core of the feed-through fibre due to the well-known effect of macro-bending, resulting in excess loss for the signal.

The prior art has tried to address these loss mechanisms in various different ways. Gapontsev avoids significant tapering of the signal fibre by pre-tapering the pump fibre. However, the arrangement is highly asymmetrical with respect to the signal fibre and this design tends to suffer from fusion-induced losses due to bending or kinking during construction. DiGiovanni addresses fusion-related losses by arranging the pump and signal fibres in a symmetric bundle. Taper-related losses due to core diameter mismatch at the splice point are addressed by employing a special single mode waveguide structure in the core of the feed-through fibre that has the same mode field diameter before and after tapering (although not in between). However, a currently commercially available 18+1 device still exhibits signal loss of 15 percent (OFS Optics Product Catalogue 2006 Part number TFB4320). Fidric addresses the taper-induced losses by individually tapering the pump fibres in a separate step prior to fusing them to the signal fibre. This reduces the amount of tapering of the signal fibre. However, in practice this design may accentuate the losses during fusion owing to the practical difficulty of arranging the pre-tapered fibres in a bundle. It is also costly to produce when the number of pump fibres is large. Taper-induced losses are also inherent in Dong.

SUMMARY OF THE INVENTION

According to the present invention there is provided a device for coupling multimode pump light and a laser signal into or out of a cladding-pumped fibre laser comprising an output optical fibre, a substantially un-tapered feed-through optical fibre, an annular waveguide having a tapered section, and a plurality of multimode pump fibres such that: the signal feed-through fibre is located within the annular waveguide; the signal feed-through fibre is fused into the annular waveguide in the tapered section so that the annular waveguide becomes an additional cladding layer of the feed-through fibre; the over-clad signal feed-through fibre is optically coupled to the output optical fibre; the multimode pump fibres are optically coupled to the annular waveguide in the un-tapered section.

The invention further provides an optical fibre amplifier, oscillator or laser including a device as described.

The invention also provides methods of forming the devices.

In a further aspect, there is provided a method of preparing a cladding-pumped device, comprising providing a capillary having a central bore large enough to accommodate the signal feed-through fibre and a plurality of bores intended for the pump fibres running along its length; fusing the pump fibres into the multi-bore capillary by heating, for the purpose of fixing the pump fibres during subsequent assembly; joining the annular waveguide to the end-face of the multi-bore capillary in such a way that the outputs of the pump fibres couple into the end of the annular waveguide; tapering the annular waveguide; fusing the signal feed-through fibre into the tapered section of the annular waveguide; fusing the over-clad signal feed-through fibre to the output fibre.

In a further aspect there is provided a second method of preparing a cladding-pumped fibre device, comprising providing a hollow core, bundling a plurality of multi-mode pump fibres around the core, fusing and tapering down the pump fibre and core to an inner diameter that is larger than a signal fibre; inserting the signal fibre into the tapered assembly, and fusing the tapered assembly onto the signal fibre; fusing the over-clad signal feed-through fibre to the output fibre.

Embodiments of the invention address the issue of taper-induced losses by:

1. Tapering the pump waveguide in a separate step prior to introduction of the signal feed-through fibre.

2. Employing little or ideally no tapering of the signal feed-through fibre when it is fused into the tapered annular waveguide.

They also address fusion-induced losses in the following ways:

1. An annular waveguide is inherently more symmetric than a fused fibre bundle

2. By coupling or forming by fusion the pump fibres into the annular waveguide structure prior to introduction of the signal feed-through fibre, unwanted deformation during heating will not affect the signal feed-through Embodiments of the invention, will now be described, by way of example only, with reference to the accompanying drawings, in which:

FIG. 1(*a*) shows a cross-section through a multiplexer/de-multiplexer;

FIGS. 1(*b*), (*c*) and (*d*) show respective cross-sections through A-A, B-B and C-C of FIG. 1(*a*);

FIGS. 2(*a*) to (*e*) show stages in the formation of a device

Figure 3A:
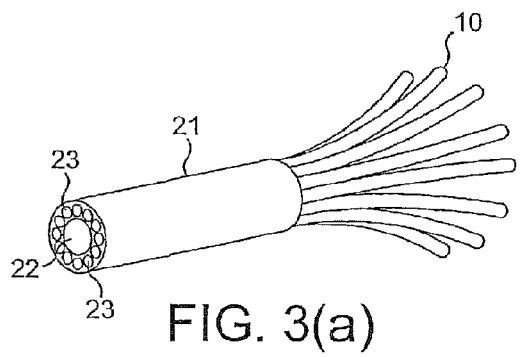
Figure 3B:
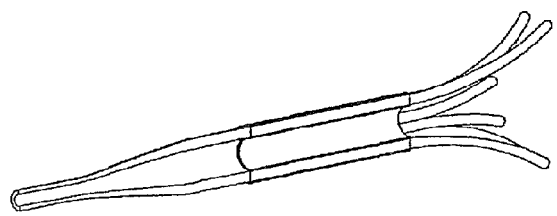
Figure 4A:
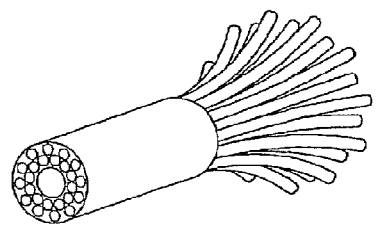
Figure 4B:
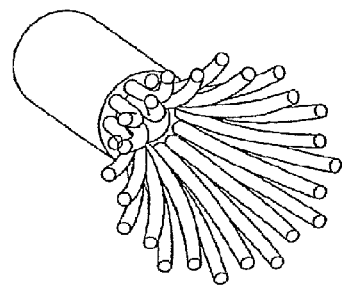

FIGS. 3(*a*) to (*b*) show stages in the formation of an alternative device that makes use of a multi-bore capillary FIGS. 4(*a*) and (*b*) show a sections through a multi-bore capillary having two layers of pump fibres; and FIGS. 5(*a*) to 5(*e*) show an alternative embodiment.

DESCRIPTION OF SOME EMBODIMENTS OF THE INVENTION

The present invention may be used as a pump and signal multiplexer/de-multiplexer for the purpose of coupling multimode pump light into the cladding of a multi-clad optical fibre and coupling a laser signal into or out of the core of the multi-clad optical fibre. The multiplexer employs a substantially fused glass construction. The novel design addresses the problems of fusion-induced losses and taper-induced losses for the signal feed-through that are inherent in the prior art and in this respect represents an advance upon the prior art. Furthermore, it is able to incorporate large mode area fibres in the signal feed-through with low signal loss.

Referring to FIGS. 1(*a*) to 1(*d*), the multiplexer consists of an output optical fibre 2001, a signal feed-through optical fibre 2002, an annular optical waveguide 2003 having a tapered section, and a plurality of multimode pump optical fibres 2004.

The output optical fibre has a core 2005, a first cladding 2006, an outer cladding 2007 and possibly intermediate cladding layers. The core of the output fibre acts as a waveguide for a laser signal. The cladding layer or layers define a multimode waveguide surrounding and including the core which guides the multimode pump light. The outer cladding layer 2007 could be a low refractive index polymer layer which gives a high numerical aperture for the multimode pump waveguide. By way of an example, the output fibre could be a double-clad fibre with a glass core and first cladding and a polymer second cladding. The diameter of the core could be 20 microns, the diameter of the first cladding could be 400 microns, the numerical aperture of the core waveguide could be 0.06, and the numerical aperture of the multimode waveguide defined by the first cladding and the second cladding could be 0.46.

The signal feed-through fibre 2002 has a core 2008 and a glass cladding 2009 and possibly additional cladding layers. The purpose of the core is to guide a laser signal 2010 through the multiplexer into or out of the core of the output fibre 2005. Ideally, the transverse mode distribution in the core of the feed-through fibre is well-matched to that in the core of the output fibre to ensure efficient coupling of the laser signal from one to the other. By way of an example, the core diameter could be 20 microns, the cladding diameter could be 200 microns, and the numerical aperture of the core waveguide might be 0.06.

The multimode pump optical fibres 2004 typically have a glass core 2011 and a glass cladding 2012. By way of an example, the core diameter could be 105 microns, the cladding diameter 125 microns, and the numerical aperture of the core equal to 0.15. When using the multiplexer as part of a fibre laser system, the optical output of a semiconductor laser diode would be optically coupled into the core at the free end of the pump fibre.

The annular waveguide 2003 is a glass optical waveguide and it is employed as an intermediate section between the multimode pump fibres and the output fibre. It has a tapered section. The purpose of the annular waveguide is to guide the multimode pump light 2013 from the multimode optical fibres into the cladding of the output fibre. In one embodiment the annular waveguide could be a silica glass capillary having a circular cross-section. By way of an example, the inner diameter of the capillary in the un-tapered section could be 600 microns and the outer diameter 1100 microns. In the tapered section of the annular waveguide, the inner diameter is similar to but slightly larger than the outer diameter of the signal feed-through fibre. In the present example, that might be 205 microns. The outer diameter of the annular waveguide in the tapered section is determined geometrically according to the tapering ratio. In this example it would be 375 microns. The degree of tapering of the annular waveguide is limited by geometrical optics considerations. According to the brightness theorem, when light propagates in a tapered waveguide, the angle of the rays of light in the core increases with respect to the axis of the waveguide. The theorem states that the square of the ray angle increases in inverse proportion to the cross-sectional area of the tapered waveguide. For an optical fibre to guide a ray of light by total internal reflection, the ray angle must be lower than the numerical aperture of the fibre, which is a function of the refractive indices of the core and the cladding. If the ray angle exceeds the numerical aperture then the ray will escape from the core into the cladding. In a typical embodiment of the present invention, the object is to couple the multimode pump light exiting the tapered end of the annular waveguide into the first cladding of the output optical fibre, and for this first cladding to guide the pump light by total internal reflection at the interface with the second cladding. Therefore, the ray angle at the output of the tapered angle waveguide must not exceed the numerical aperture determined by the refractive indices of the first and second claddings of the output fibre, which in the present example is 0.46. As described above, the output ray angle is determined by the input ray angle and the degree of tapering of the waveguide. In the present example, the maximum input ray angle is approximately 0.15, determined by the numerical aperture of the multimode pump optical fibre. The output ray angle should not exceed the numerical aperture of the output fibre pump waveguide which is 0.46 as described previously. According to the brightness theorem, the maximum degree of tapering of the linear dimensions of the annular waveguide is therefore approximately 0.46/0.15 which is roughly equal to 3.

FIGS. 2(a) to (e) show steps in the construction of a schematic device.

The device is constructed by coupling the outputs of multimode pump fibres (40) into the un-tapered end of an annular waveguide (20), for example by fusion splicing. A signal feed-through fibre (30) is inserted into the annular waveguide and the annular waveguide is heated in the tapered section and collapsed on to the signal feed-through fibre to form an additional cladding layer of the feed-through fibre. This fused section is cleaved and joined onto the output optical fibre, for example by fusion splicing (FIG. 2(e)). The resulting assembly might be recoated with a polymer to improve the strength of the assembly and/or to provide an additional cladding layer. A laser signal can be coupled into or out of the core of the output fibre via the core of the feed-through fibre. Multimode pump light is coupled into the free ends of the pump fibres. It propagates through the tapered annular waveguide and into the cladding of the output optical fibre.

In a second embodiment, it is recognized that in some cases of practical interest it may not be straightforward to fusion splice a large number of pump multimode fibres directly onto the end of a capillary as described in the first embodiment. Therefore, in a second embodiment (FIG. 3a, FIG. 3b) a multi-bore capillary 21 is employed as an aid to fixing the fibres in place and joining them to the capillary.

The multi-bore capillary has a central bore 22 having a diameter sufficiently large for the signal feed-through fibre to pass through it. It also has multiple holes 23 running axially along its length that are intended to receive the plurality of multimode pump fibres.

In the assembly of the device, the plurality of multi-mode pump fibres are inserted into the plurality of axial holes in the multi-bore capillary, and the resulting assembly is fused into a monolithic glass structure by heating. At this point, the plurality of multimode fibres are easy to manipulate as a single unit, and they can be joined to the annular waveguide by fusion splicing more easily than in the first embodiment.

The other aspects of this embodiment such as the tapered annular waveguide, the signal feed through fibre, and the output fibre are as described in the first embodiment.

By way of an example that is consistent with the figures quoted in the first embodiment, the multi-bore capillary might have a central bore with a diameter of 500 microns, an outer diameter of 1400 microns, and the number of axial holes for the pump fibres could be 20, evenly spaced in a circle around the axis of the capillary at a distance of 1000 microns from the axis. The diameter of the axial holes might be 128 microns.

In one embodiment, the annular waveguide is constructed out of fused silica or quartz. It could also be constructed out of a composite glass such a fluorine doped silica or some other glass composition. The annular waveguide might have some form of cladding that would modify its light-guiding properties. For example, it might have a thin fluorine-doped layer either on the inside or outside or both that would result in total internal reflection for some or all of the pump light inside the annular waveguide.

The annular waveguide preferably has perfectly circular inner and outer cross-sections. However, the annular waveguide need not have perfectly circular inner and/or outer cross-sections. The annular waveguide could also have a polygonal or shaped inner and/or outer cross-section and remain within the spirit of this invention.

The core of the signal feed-through fibre might have waveguide properties such that it supports a single transverse mode, a few transverse modes, or multiple transverse modes. It might also be a photonic crystal core that has a number of holes running axially along its length.

One application of the optical fibre multiplexer is for pumping an optical fibre amplifier or laser. In this arrangement, the output fibre of the multiplexer might have a rare-earth doped core, or the output fibre would be subsequently joined to an optical fibre having a rare earth doped core. In the case of a laser, the output fibre might additionally incorporate wavelength selective components e.g. gratings. Such an amplifier or laser may be pumped from a single end or from both ends.

Note that in some embodiments of the invention, the pump combiner might have multiple layers of pump fibres for the purpose of increasing the amount of pump power coupled into the cladding-pumped fibre by the device. FIGS. 4 (a) and (b)

show an example having two layers. There may of course alternatively be just one layer or more than two layers.

FIG. 5(a) to 5(e) shows a further embodiment.

Figure 5A:
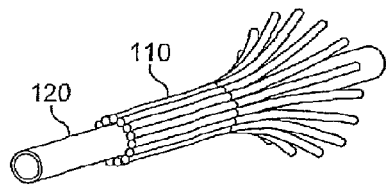
Figure 5B:
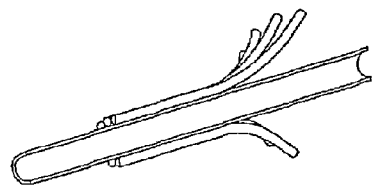
Figure 5C:
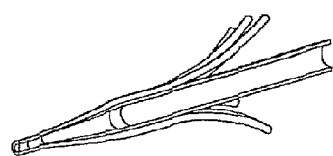
Figure 5D:
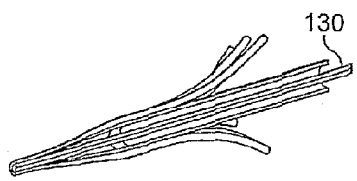
Figure 5E:
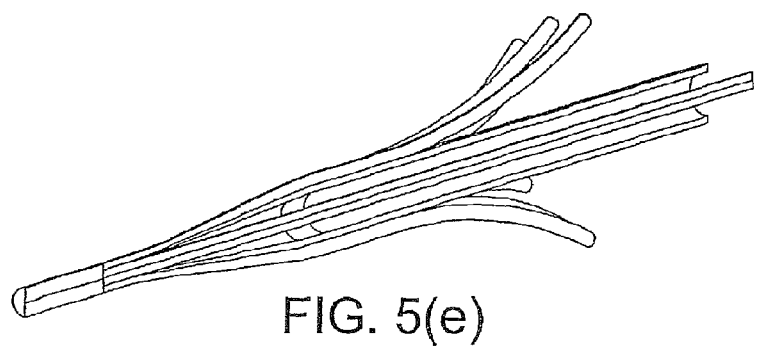

In this embodiment, a bundle of multimode fibres 110 is wrapped around a tubular (preferably circular) former 120. They may helically wrapped, longitudinally wrapped or otherwise wrapped. FIG. 5(b) shows a longitudinal cross section through the assembly. The former and wrapped multimode fibres are then fused and tapered down (FIG. 5(c)) to an inner diameter that is larger than a signal fibre 130 (FIG. 5(d)) which is then inserted into the fused and tapered assembly. The fused and tapered assembly forms a tapered annular waveguide. The signal fibre 130 is then inserted into the tapered assembly and is fused onto the signal fibre. As described above, the fact that tapering occurs before the signal fibre is introduced means that very little, if any, deformation of the signal fibres occurs and this is advantageous for the reasons given. This can then be cleaved and then spliced to an output fibre.

In a preferred embodiment, the annular waveguide is constructed predominantly out of fused silica having one or more fluorine-doped silica layers. These layers might be on the inner, outer or both surfaces and serve several purposes, including aiding the construction of the device and providing desirable optical properties, since fluorine doping reduces both the melting point and the refractive index of the glass. By way of example, the capillary might have an outer diameter of 320 microns and an inner diameter of 256 microns and it might have fluorine doped silica layers on the inner and outer surfaces having a thickness of 10 microns. The refractive index of fused silica at 1064 nm is around 1.45 and the fluorine doped silica might be doped to have a refractive index of around 1.433. It could also be constructed out of some other composite glass composition including elements such as germanium, boron, aluminum, or phosphorous. Optically, the fluorine doped layers act as a low refractive index cladding layer. Stray radiation may be totally internally reflected by this layer and thereby confined to the feed-through fibre providing additional pump isolation. In this case the fluorine doped layer is an alternative to the pedestal or triple clad structure in the feed-through fibre. Mechanically, the softer fluorine doped glass may be advantageous in the construction of the device. Specifically, the interface between the outer fluorine doped layer on the capillary and the fluorine-doped cladding layer on the pump fibres increases the strength of the device.

The invention claimed is:

1. A device for coupling multimode pump light and a laser signal into or out of a cladding-pumped fibre laser comprising an output optical fibre, a substantially un-tapered feed-through optical fibre, an annular waveguide having a tapered section, and a plurality of multimode pump fibres such that:

the signal feed-through fibre is located within the annular waveguide;

the signal feed-through fibre is fused into the annular waveguide in the tapered section so that the annular waveguide becomes an additional cladding layer of the feed-through fibre;

the over-clad signal feed-through fibre is optically coupled to the output optical fibre; and the multimode pump fibres are optically coupled to the annular waveguide in the un-tapered section.

2. The device of claim 1, where the output of the plurality of multimode pump fibres is coupled into the end of the annular waveguide.

3. The device of claim 1, wherein the plurality of multimode pump fibres are arranged circumferentially around a hollow former, and the multi-mode fibres and former are fused together and tapered to form the tapered annular waveguide.

4. The device of claim 1, where the output fibre is a multi-clad optical fibre.

5. The device of claim 1, where the output fibre is a doped optical fibre.

6. The device of claim 1, wherein the signal feed-through fibre is located axially centrally within the annular waveguide.

7. The device of claim 1, including a plurality of layers of pump fibres.

8. The device of claim 1, wherein the annular waveguide has circular inner and/or outer cross-sections.

9. The device of claim 1, wherein the annular waveguide has a polygonal or other non-circular inner and/or outer cross-section.

10. The device of claim 1, wherein the feed-through fibre has a core having waveguide properties supporting one or a plurality of transverse modes.

11. A method of preparing a cladding-pumped fibre device, comprising providing a multi-bore capillary having a central bore sufficiently large to accommodate the signal feed-through fibre and a plurality of bores intended to accommodate the multimode pump fibres running along its length, inserting the pump fibres into the pump bores, and fusing the pump fibres into the multi-bore capillary.

12. A method as claimed in claim 11, further comprising offering up an annular waveguide to the face of the fused multi-bore capillary structure and fusing the two together in such a way that the optical output of the multimode pump fibres couples into the end of the annular waveguide.

13. A method as claimed in claim 12, further comprising tapering the annular waveguide to an inner diameter larger than a signal fibre, inserting a signal fibre into the tapered assembly, and fusing the tapered assembly onto the signal fibre.

14. A method as claimed in claim 12, further comprising cleaving the assembly and splicing it to an output fibre.

15. A method as claimed in claim 14, wherein the assembly is cleaved at a waist.

16. A method as claimed in claim 14, wherein the output fibre is a multi-clad fibre.

17. A method of preparing a cladding-pumped fibre device, comprising providing a hollow former arranging a plurality of multi-mode pump fibres in a bundle around the former, fusing and tapering down the pump fibre and former to an inner diameter that is larger than a signal fibre to form a tapered annular waveguide; inserting the signal fibre into the tapered assembly, and fusing the tapered assembly onto the signal fibre.

18. A method as claimed in claim 17, further comprising placing a glass sleeve over the bundle of pump fibres and the former prior to fusing this structure and tapering it to form the tapered annular waveguide.

19. A method as claimed in claim 17, further comprising cleaving the assembly and splicing it to an output fibre.

20. A method as claimed in claim 19, wherein the assembly is cleaved at a waist.

21. A method as claimed in claim 17, wherein the output fibre is a multi-clad fibre.

22. A method as claimed in claim 17, wherein the former is a capillary of substantially circular inner diameter.

23. A method as claimed in claim 17, wherein the sleeve is a capillary of substantially circular inner diameter.

24. A method as claimed in claim 17, wherein the sleeve ultimately forms a cladding layer of the assembly.

25. A method as claimed in claim 11, wherein the signal core is doped with a rare earth material.

26. A method as claimed in claim 11, wherein the signal core is provided with diffraction gratings.

27. A method as claimed in claim 11, wherein the fibre device is a cladding pumped fibre laser or an optical amplifier.

28. A method as claimed in claim 11, wherein the multimode fibres are initially provided in two or more layers.

* * * * *